United States Patent [19]
Dolatowski et al.

[11] Patent Number: 4,936,720
[45] Date of Patent: Jun. 26, 1990

[54] COMPACT DEVICE FOR CUTTING HOLES IN PIPE

[75] Inventors: Edwin H. Dolatowski, Des Plaines; John M. Porzio, Barrington, both of Ill.

[73] Assignee: Fend Industrial Tool Inc., Chicago, Ill.

[21] Appl. No.: 412,658

[22] Filed: Sep. 26, 1989

[51] Int. Cl.[5] .............................................. B23B 45/14
[52] U.S. Cl. ........................................ 408/75; 408/92; 408/100; 408/111; 408/712
[58] Field of Search ........................ 408/75, 76, 92, 99, 408/100, 110, 111, 712, 716

[56] References Cited

U.S. PATENT DOCUMENTS

| | | | |
|---|---|---|---|
| 1,434,946 | 11/1922 | Fiorillo | 408/111 |
| 2,492,783 | 12/1949 | Chamberlain | 408/712 |
| 2,672,770 | 3/1954 | Buck | 408/76 |
| 3,741,670 | 6/1973 | Wood | 408/92 |
| 3,922,107 | 11/1975 | Fowler | 408/92 |
| 3,967,687 | 7/1976 | Fowler | 408/92 |
| 4,277,208 | 7/1981 | Jackson et al. | 408/16 |
| 4,533,284 | 8/1985 | Agius et al. | 408/92 |

FOREIGN PATENT DOCUMENTS

| | | | |
|---|---|---|---|
| 124504 | 7/1984 | Japan | 408/76 |

OTHER PUBLICATIONS

Victaulic Operating Instructions, Victaulic Company of America, South Plainfield, N.J. 07080, Mar. 1978, pp. 1–8.

Catalog Sheet from Milwaukee Brand Heavy-Duty Drill Stands, Milwaukee Electric Tool Corporation, Milwaukee, Wisc., date unknown, p. 23.

Pace Porta Bore "The Portable Pipe Drilling Machine with the Big Punch!", Two-Page brochure, date unknown, Pace Machinery and Fittings, Inc., Wasco, Ill. 60183.

"Fire Protection Industry, Here It Is! The Hole Thing", Four-page brochure, 1987, Fend Industrial Tool Inc.

*Primary Examiner*—Daniel W. Howell
*Attorney, Agent, or Firm*—Welsh & Katz, Ltd.

[57] ABSTRACT

A device for cutting holes in pipe includes a base configured for attachment normal to a section of pipe and having a track extending the length of the base, a travel plate slidably engaged in the track and configured for the accommodation of a power drill thereon, a mechanism for controlling the linear reciprocal movement of the travel plate in the track, the length of the base being just long enough to accommodate the drill and hole drilling bit assembly for operating the apparatus in close quarters. A hole locator, and an adapter for attachment of the base to smaller diameter pipes may also be provided.

18 Claims, 2 Drawing Sheets

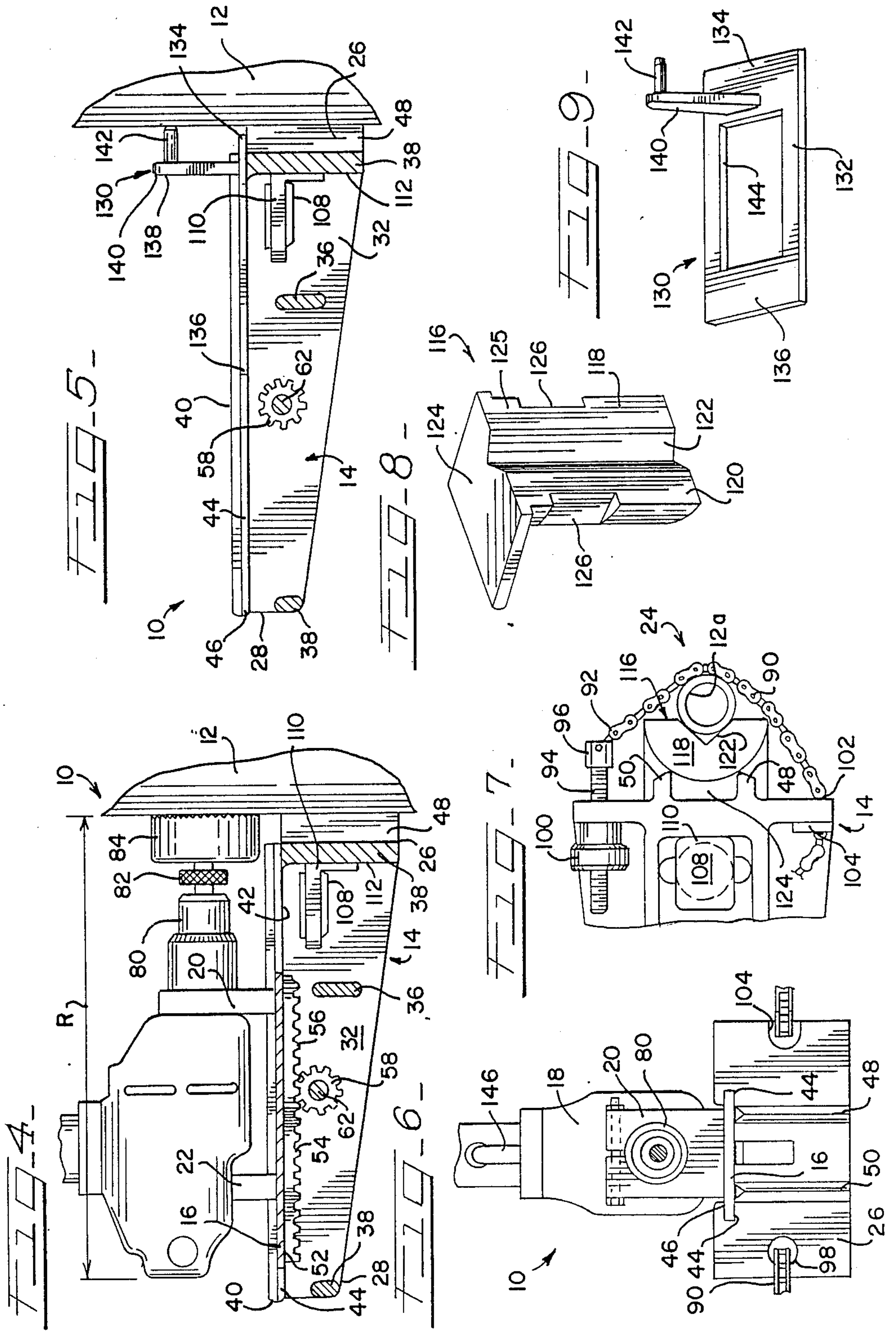

COMPACT DEVICE FOR CUTTING HOLES IN PIPE

BACKGROUND OF THE INVENTION

The present invention relates to a device for cutting holes in pipe, and specifically provides such a device for use in the installation of fire prevention sprinkler systems or the like where work must be performed in close or cramped conditions.

Conventional types of hole cutting devices are most commonly used in either new construction, in the remodeling of existing structures, or wherever additions or alterations to water conduits or plumbing systems need to be made. Conventional pipe hole cutting devices include a base portion which is clamped to the pipe so as to be normal thereto, and which has a linear track along an upper end. A travel plate is also provided for reciprocal movement in the track, with the movement manually controlled through a rack and pinion gear mechanism. A power drill is secured to the travel plate so that as the travel plate is moved, the drill may be brought into contacting relationship with the pipe for drilling the hole.

An important drawback of existing hole cutting devices is that they are cumbersome to use effectively in cramped working environments, whether in new or existing structures. A principal cause of this drawback is due to the length of the base and the travel plate. However, mere shortening of the components in conventional devices has not been effective, due to the operational requirements of this type of device.

Another disadvantage of existing devices is the inability to precisely determine the point at which the drill will impact the pipe prior to the securing of the device upon the pipe. Once the device is secured to the pipe, if it is determined that the hole will not be drilled in the specific location, the base must be moved on the pipe. This process is a tedious one, for disassembly of the device and readjustment of the base upon the pipe are often required, and frequently is frustrated by the bulk of the device in combination with the often cramped working environment.

A further drawback of conventional pipe cutting devices is that they include a base portion which is optimally dimensioned for use on a relatively larger diameter pipe from about 2½" up to 10". However, the existing device has not been effective on smaller pipes having diameters in the range of 1" to 2½".

Thus, there is a need for a hole cutting device which is compact enough for use in cramped conditions, which is capable of being accurately aligned with the specified location of the hole prior to the final assembly of the device on the pipe, and which is adaptable for cutting holes in smaller diameter pipe.

SUMMARY OF THE INVENTION

Accordingly, the present invention provides a compact device for cutting holes in pipe, including a base having a linear track along an upper end and a front end configured for engagement with a section of pipe, a mechanism for adjustably securing the base to the pipe, a travel plate configured for reciprocal movement in the track and having a power drill mounted thereon, the length of the base being just long enough to accommodate the length of the drill when the drill is equipped with a hole cutting bit assembly. A rack and pinion assembly used to control the reciprocal movement of the travel plate is positioned to maximize performance of the device in the shortened configuration.

If desired, the device may also be provided with a hole locator which is configured to be reciprocally slidable in the track and has a peg or similar formation for identifying the location of the hole to be bored by the power drill. The locator is lightweight and enables ready adjustment of the base upon the pipe without the need for mounting the drill and travel plate. Also, an adapter may be provided to enable attachment of the base to small diameter pipes in the range of 1–2".

BRIEF DESCRIPTION OF THE DRAWINGS

FIG. 4 is a partial vertical sectional view of the present hole cutting device;

FIG. 5 is a partial vertical sectional view of the base portion of the device shown in FIG. 4 and illustrating the present hole locator engaged thereon;

FIG. 6 is a front elevational view of the device depicted in FIG. 4;

FIG. 7 is a partial bottom view of the base of the device shown in FIG. 6 and equipped with a small pipe adapter;

FIG. 8 is a front perspective elevational view of the small pipe adapter as shown in FIG. 7; and FIG. 9 is a top perspective elevational view of the hole locator depicted in FIG. 5.

DESCRIPTION OF THE PREFERRED EMBODIMENT

Figure 1:
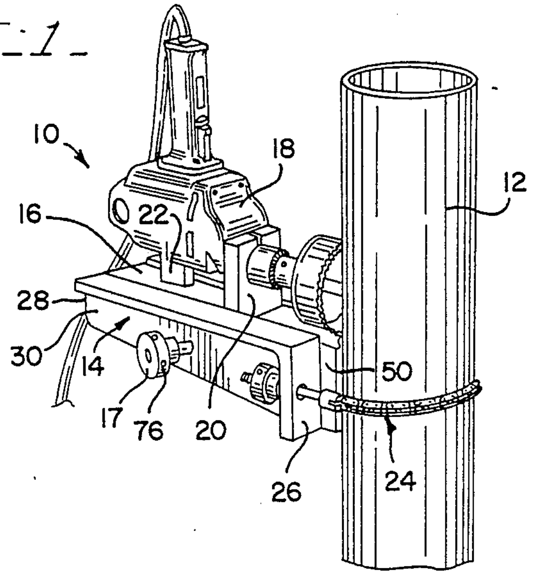
FIG. 1 is a front perspective elevational view of the hole cutting device embodying the present invention shown secured to a section of pipe.

Referring now to the drawings, and specifically to FIG. 1; the pipe hole cutting device of the invention is generally designated by the reference numeral 10. The device 10 is designed to be releasably secured to a section of pipe 12 such as water supply pipe of the type used in plumbing or in automatic fire protection sprinkler systems. The device 10 may be secured either to pipe sections 12 which are either vertically oriented, as shown, or horizontally oriented.

The device 10 basically includes a base generally designated 14 which is secured to the pipe 12 and into which a travel plate 16 is inserted for reciprocal linear movement. A rack and pinion mechanism, generally designated 17, controls the movement of the travel plate 16 in the base 14. A power drill 18 is mounted upon the travel plate 16 in an inverted position by means of front and rear shoes, 20 and 22, respectively, which are mounted to the travel plate by screws (not shown). The drill 18 is preferably a heavy duty, low rpm (approximately 450 rpm), high power (approximately 7 amp) unit. Such a unit is available from the Milwaukee Tool Co., Milwaukee, Wis. In the case of the rear shoe 22, the screws attaching the shoe to the plate 16 also engage the drill 18. The base 14 is secured to the pipe 12 by a wrench chain generally designated 24.

Figure 2:
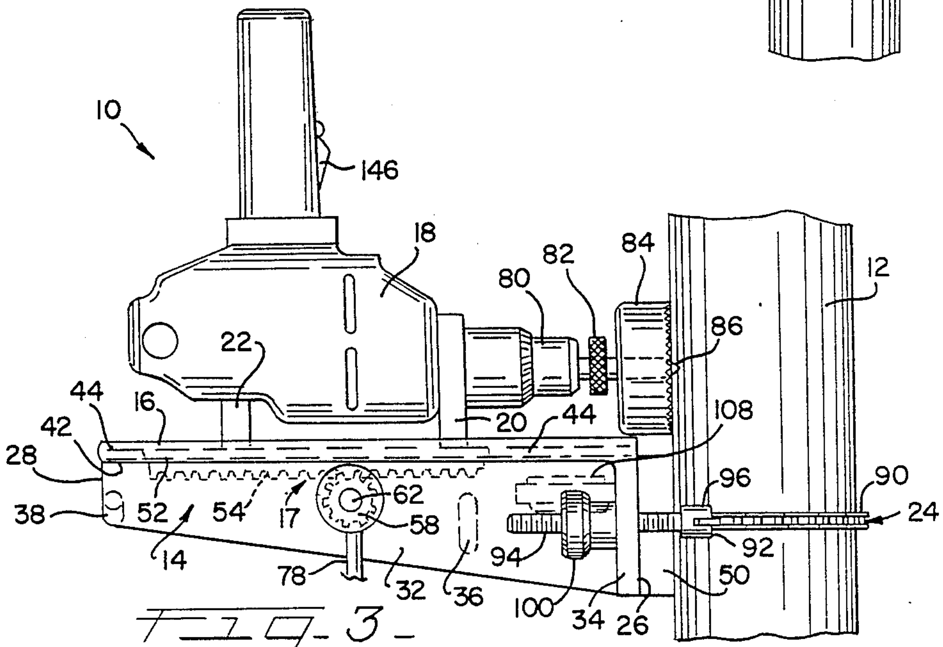
FIG. 2 is a side elevational view of the device depicted in FIG. 1.
Figure 3:
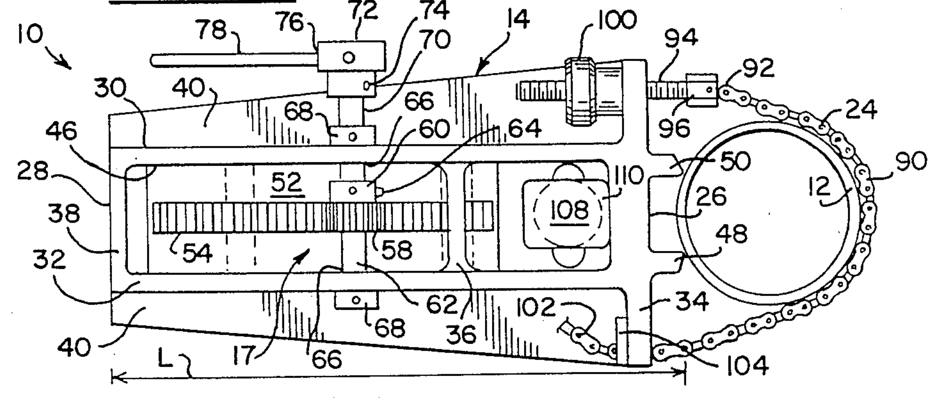
FIG. 3 is a bottom view of the device depicted in FIG. 1.

More specifically, and referring now to FIGS. 2–4, the base 14 has a length "L", a front end 26 and a rear end 28 and basically includes a pair of elongate members 30 and 32 which are substantially mirror images of each other. The members 30, 32 are maintained in spaced, parallel relationship to each other by front, middle and rear support ribs 34, 36, 38, respectively, with the middle rib 36 being located closer to the front rib 34 than to the rear rib 38. A wing or flange 40 projects laterally from the upper end 42 of each of the members 30 and 32. Each flange 40 has a laterally extending groove 44 therein (best seen in FIG. 6) which preferably projects the entire length of each of the members 30, 32. The grooves 44 of each wing 40 oppose each other to form a track 46 into which the travel plate 16 is inserted. The base 14 also preferably includes a pair of vertical ribs 48 and 50, respectively, which are secured to the front end 26 and are configured to engage the pipe 12 for the purpose of centering the base on the pipe. In the preferred embodiment, the base 14 is cast as a single unit in aluminum or an equivalent rigid yet lightweight material, and all corners and edges may be radiused for safety.

The travel plate 16 has an underside 52 to which is attached an elongate rack 54 having a plurality of teeth 56. The rack 54 preferably extends the length of the travel plate 16. The teeth 56 of the rack 54 are configured to mesh with a pinion gear 58 which has a hub 60 and is secured to a pinion shaft 62 by fasteners 64 such as setscrews located in the hub 60. The pinion shaft 62 is preferably located on the base 14 approximately midway between the front end 26 and the rear end 28, and is passed through coaxial bores 66 in each of the elongate members 30, 32. The bores 66 are dimensioned to permit axial rotation of the shaft 62 therein. A set locking collar 68 is secured to the pinion shaft 62 as it exits each of the bores 66 to secure the position of the shaft relative to the base 14 so that one shaft end 70 extends slightly past the wing 40. A traverse hub 72 is secured to the shaft end 70, preferably by at least one setscrew 74, and is provided with a plurality of sockets 76. An insulated handle 78 is provided which is insertable into any one of the sockets 76 to axially rotate the pinion shaft 62 and, accordingly, the pinion gear 58. In this manner, the travel plate may be moved reciprocally in the track 46. The rack 54, pinion gear 58, shaft 62, collars 68 and hub 72 may be collectively referred to as the rack and pinion assembly 17.

In providing the present device 10 to be as compact as possible, it is important that the length "L" of the base 14 be just long enough to accommodate or generally correspond to the length "R" (best seen in FIG. 4) of the drill 18, including a chuck 80, an arbor 82, and a cupsaw 84 or other type of drilling or tapping device. The cupsaw 84 may optionally be equipped with a pilot drill 86 (best seen in FIG. 2). To ensure optimal performance of the device 10 with the base 14 so dimensioned, it is important that the rack and pinion assembly 17 be located upon the base to ensure continual meshing engagement of the rack 54 and the pinion 58 during the entire operational travel of the drill 18. To this end, the rack 54 has been dimensioned to extend the entire length of the travel plate 16, and the pinion shaft 62 has been located approximately midway between the front end 26 and the rear end 28 of the base 14. Thus, the aforementioned meshing engagement will be preserved, even when the drill 18 is used to cut holes through both sides of the pipe 12. If the pinion shaft 62 is not properly positioned, the rack 54 may become disengaged from the pinion gear 58 during the operational movement of the drill 18 in the track 46.

Referring now to FIGS. 2–4 and 6, in order to secure the device 10 to the pipe 12, the wrench chain 24 is provided. The chain 24 includes a length of roller chain 90, one end of which is secured to a threaded rod 94 at a boss 96. The rod 94 is inserted through an opening 98 (best seen in FIG. 6) in the front end 26 of the base and is secured by a chain tightening hub 100. The other end 102 of the chain 90 is passed around the pipe 12 and secured in a notched chain securing bracket 104 (best seen in FIG. 3). The bracket 104 is located in the front end 26 of the base 14 opposite to the opening 98. Minor adjustments to the tension of the chain 90 may be made by the chain tightening hub 100.

In order to ensure that the base 14 is secured perpendicularly to the pipe 12 regardless of whether the pipe is vertically, horizontally or otherwise angularly positioned, an angle indicator 108 may be provided. Although conventional hole cutters have been provided with such angle indicators, they have been mounted to the cutter in locations where they are readily damaged. Accordingly, in the preferred embodiment, the indicator 108 is mounted by means of an "L" bracket 110 to a rear face 112 of the rib 38, and is centrally located between the elongate members 30 and 32. The indicator is thus readily visible by an operator before the drill 18 is moved in close proximity to the pipe 12 and is protected from damage.

Referring now to FIGS. 7 and 8, the device 10, in its standard configuration as illustrated in FIGS. 1–6, is capable of attachment to pipes having diameters of approximately 2–10". For applications where the pipe diameter is approximately $1\frac{1}{2}$–2", a small pipe adapter 116 may be provided. The adapter 116 includes a semi-cylindrical base portion 118 with a generally flat front face 120. A vertically extending wedge-shaped recess 122 is centrally located in the face 120. A rearwardly projecting flange 124 is integral with an upper end 125 of the base portion 118 and is dimensioned to slidably engage the track 46. The base portion 118 may be provided with chain cutouts 126 on each side to accommodate the chain 90.

Assembly of the small pipe adapter 116 to the base 114 is shown in FIG. 7 and is accomplished by inserting the flange 124 into the track 46 at the front end 26 of the base 14 until the base portion 118 contacts the ribs 48, 50. If desired, locking means, such as a setscrew (not shown), may be provided to secure the flange 124 within the track 46. The wrench chain 24 is deployed around the smaller diameter pipe 12*a* in similar fashion as described above in relation to FIGS. 1–4 and 6. The wedge-shaped recess 122 is dimensioned to engage the pipe 12*a*.

Referring now to FIGS. 5 and 9, a common problem of conventional hole cutters is that once the operator has determined the location of the hole to be drilled, it is difficult to accurately position the cutter upon the pipe so that the hole will be precisely drilled in the specified location. If the cutter is improperly positioned, its cumbersome weight and size make accurate adjustment a time consuming operation. Accordingly, the present device 10 includes a hole locator 130 which is designed to address this problem. The locator 130 includes a planar baseplate 132 which is dimensioned to slidingly engage the track 46 and has a front end 134 and a rear end 136. A vertically projecting support 138 having an upper end 140 is located near the front end 134. The upper end 140 is provided with a forwardly projecting formation 142, preferably a peg, which is dimensioned to project beyond the front end 134 to impact the same point on the pipe 12 as does the pilot drill 86 (best seen in FIG. 2) when a hole is about to be drilled. Even if a pilot drill 86 is not employed, the peg 142 may still be used to indicate the center of the hole to be drilled. In the alternative, the formation 142 may be configured to resemble another type of bit such as a cupsaw, to ensure accurate positioning of the device 10. The baseplate 132 is preferably provided with a central opening 144 through which the operator may view the angle indicator 108.

In operation, once the position of the hole to be drilled has been specified, the base 14 is positioned so that the ribs 48, 50 are placed in contact with the pipe 12. The free end 102 of the chain 90 is looped around the pipe 12 and is secured as tightly as possible in the bracket 104. Additional tension may be placed on the chain through the use of the hub 100. To accurately pinpoint the position of the base 14, the hole locator 130 is inserted into the track 46 at the rear end 28 and is slid forward until the peg formation 142 impacts the pipe 12. The position of the peg 142 should coincide with the prespecified location of the hole. If necessary, minor adjustment to the position of the base 14 may be made by rotating the hub 100 to slightly loosen the tension of the chain 90.

Once the base 14 is accurately secured to the pipe 12 the hole locator 130 is removed from the track 46 and, travel plate 16 and drill 18 assembly is placed in the track 46 at the rear end 28. The travel plate 16 is slid in the track 46 until the rack 54 engages the pinion gear 58. At this time, the handle 78 may be inserted into one of the sockets 76 to enable the operator to move the drill bit into position, the accuracy of which has been confirmed by the hole locator 130. When appropriate, the drill is activated by pushing on the switch 146. If working conditions are extremely close, the travel plate 16 and drill 18 may be inserted onto the base 14 before the base is attached to the pipe 12, although this procedure probably precludes the use of the hole locator 130.

Thus, the compact hole cutting device of the invention facilitates the drilling of holes in pipe in close or cramped working conditions, and provides for greater accuracy in drilling than available from conventional devices.

While a particular embodiment of the compact device for cutting holes in pipe of the invention has been shown and described, it will be appreciated by those skilled in the art that changes and modifications may be made thereto without departing from the invention in its broader aspects and as set forth in the following claims.

We claim:

1. A device for creating holes in pipe, comprising:

a base having a length and including a pair of elongate members being disposed in spaced parallel relation to each other, each said member having an upper end with a laterally extending groove, said grooves of each of said members defining a track, said base also having a front end configured for engagement with a section of pipe;

means for securing said base to the section of pipe;

a travel plate having a length and being configured for reciprocal movement in said track, said travel plate also having means for accommodating a power drill thereon;

a power drill having a length and a chuck adapted for receiving a hole cutting bit assembly therein, said bit assembly also having a length;

controlling means on said travel plate and said base for controlling the reciprocal movement of said plate in said track;

a hole locator having means for slidingly engaging said track on said base and having a forwardly projecting formation; and said length of said base being just long enough to generally correspond with said length of said drill and said bit assembly when said bit assembly is engaged in said drill.

2. The device as defined in claim 1 wherein said travel plate has first and second ends, and an underside provided with a toothed rack extending from said first end to said second end.

3. The device as defined in claim 2 wherein said means on said base for controlling the reciprocal movement of said travel plate in said track includes a shaft transversely mounted between said base members for rotation therein, a pinion gear fixed to said shaft and configured to mesh with said rack, and articulating means for manipulating the rotation of said axle.

4. The device is defined in claim 3 wherein said shaft is located on said base generally midway in said base length.

5. The device as defined in claim 1 wherein said means for securing said base to the section of pipe is a wrench chain assembly.

6. The device as defined in claim 1 wherein said front end of said base is provided with a pair of spaced, forwardly extending, generally vertical ribs for engaging the section of pipe.

7. The device as defined in claim 1 further including a small pipe adapter having an upper flange for engaging said track at said front end of said base, and also having a vertical portion with a generally vertically projecting wedge-shaped recess on a front face thereof.

8. The device as defined in claim 7 wherein said small pipe adapter further includes at least one chain cutout on said vertical portion.

9. The device as defined in claim 1 wherein said formation is positioned on said locator so as to indicate the position at which the hole cutting assembly will impact the pipe when the apparatus is fully assembled on the pipe.

10. The device as defined in claim 9 wherein said formation is a peg.

11. The device as defined in claim 1 wherein said base includes an angle indicator mounted near said front end between said elongate members.

12. A compact lightweight device for creating holes in pipe in cramped working environments, comprising:

a unitary base including a pair of elongate members, each having a length and being maintained in spaced parallel relation to each other only by front, middle and rear support ribs, respectively, each said member having an upper end with a laterally extending groove projecting said length of said member, said grooves of each of said members defining a track, said base also having a front end configured for engagement with a section of pipe;

a wrench chain associated with said front end of said base for securing said base to the section of pipe;

a travel plate having a length, a rear end, an underside, and being configured for reciprocal movement in said track, said travel plate having means for accommodating a power drill thereon, and also having a toothed rack on an underside thereof, said rack extending said length of said plate;

a power drill having a rear end, a length and a chuck adapted for receiving a hole cutting bit assembly therein, said bit assembly also having a length;

a pinion shaft transversely mounted in said base for rotation therein and having a pinion gear disposed to engage said rack, said shaft being located approximately midway in said length of said base; and said drill being mounted on said travel plate so that said rear end of said drill is in general alignment with said rear end of said travel plate, said length of said base being just long enough to generally correspond with said length of said drill equipped with said bit assembly when said drill is mounted on said travel plate and said travel plate is engaged in said track, so that the device is operationally compact for use in cramped working conditions.

13. The device as defined in claim 12 further including a hole locator having a planar base plate being engagable in said track prior to the installation of said travel plate and having a forwardly projecting formation positioned to simulate the position at which the bit assembly will impact the pipe.

14. The device as defined in claim 13 wherein said hole locator includes a vertical support projecting upwardly from a front portion of said base plate and having said forwardly projecting portion being attached to an upper end of said support.

15. The device as defined in claim 14 wherein said forwardly projecting portion is a peg.

16. A hole locator for a pipe hole cutting device having a base formed by a pair of parallel, spaced, elongate members, having a front end and a track in an upper surface thereof, the base being configured to be secured against a section of pipe at the front end thereof, said hole locator comprising:

a planar base plate having a front end and configured to slide linearly in the track;

a vertical support secured to said front end; and a forwardly projecting locator formation secured to an upper end of said support for marking the location of a hole to be made in the pipe by the apparatus.

17. The locator as defined in claim 16 wherein said planar baseplate has a substantially open central portion.

18. The locator as defined in claim 16 wherein said formation is a peg.

* * * * *